Patented Aug. 13, 1929.

1,724,108

UNITED STATES PATENT OFFICE.

JULIUS RATH, OF FRANKFORT-ON-THE-MAIN, GERMANY, ASSIGNOR TO GENERAL ANILINE WORKS, INC., OF NEW YORK, N. Y., A CORPORATION OF DELAWARE.

PROCESS OF DYEING VEGETABLE FIBERS.

No Drawing. Application filed February 17, 1927, Serial No. 169,140, and in Germany February 22, 1926.

My invention relates to a new process of dyeing vegetable fiber consisting in producing mixtures of sulfur dyes with ice colors on the fiber, and to preparations consisting of mixtures of an azodyestuff component, a sulfur dye and preferably also of agents necessary for dissolving and dyeing, which are suitable for carrying out my process of dyeing.

For producing mixtures of sulfur dyes and ice colors on the fiber the fixation of a sulfur dye on the fiber is to be combined with the production of an insoluble azodyestuff on the fiber according to the ice color method.

In order to carry out my process practically the material is impregnated with a solution containing besides an azo component a sulfur dye, dissolved in the customary manner by means of sodium sulfide or hydrosulfite or of both, and the ice color is developed by means of a diazo solution and simultaneously the leuco compound is converted into the sulfur dye.

It is not necessary to exceed the temperature of impregnation usual for the ice colors' process. In spite of the unusual method of dyeing, the temperature being very low for dyeing with sulfur dyes, uniform and non-bronzing dyeings are obtained. It is a surprising fact that the sodium sulfide contained in the impregnating liquor does not influence the activity of the diazo solution as to the development of the ice color even if the material is not dried after impregnation or if the excess of the impregnating liquor, mechanically adherent to the material is not removed as usual by centrifuging or squeezing the material, but if the impregnated material is only allowed to drain and then immediately developed with the diazo solution. When using several arylides of 2.3-hydroxynaphthoic acid as azo components, one may add, if necessary, formaldehyde to the impregnating liquor.

In this manner it is possible to shade sulfur dyes as well with ice colors as, vice versa, ice colors with sulfur dyes without complicating the usual process of dyeing with ice colors. The technical importance of my new process is based on the fact that dyeings can be obtained by means of sulfur dyes distinguished by an unusual fullness and fastness and that it is possible to shade sulfur dyes in a simple manner also toward the red side of the scale, whereas sulfur dyes do not exist hitherto therefor, as is well known.

For my process the sulfur dyes of all classes come into consideration; as azo compounds the following may be used: the naphthols, acylaminonaphthols such as benzoylaminonaphthols, the derivatives of 1-hydroxynaphthalene-4-carboxylic acid, described in U. S. Patent No. 1,453,660, the arylides of 2.3-hydroxynaphthoic acid, bodies containing a methylene group which is capable of combining with diazo compounds, as for example pyrazolone derivatives or derivatives of $\beta$-ketone-aldehydes, such as the acyl acetic acid arylides, the di- and the mono-acyl acetic acid arylides described in British Patents No. 211,772 and 211,814 and others.

My invention relates also, as said above, to mixtures, consisting of an azodyestuff component, of a sulfur dye and preferably of additions appropriate for dissolving and dyeing. These mixtures give to the consumer a particular commodity in carrying out my new process of dyeing, because they yield impregnating baths, immediately ready for use, when simply dissolved in boiling water.

As such a preparation a mixture may be named, for instance, containing a black sulfur dye, the anilid of 2.3-hydroxy-naphthoic acid and some additions, suitable for dissolving and dyeing, namely Turkey red oil, anhydrous sodium sulfide, Glauber's salt and para-formaldehyde.

In order to further illustrate my invention the following examples are given; I wish it however understood that I am not limited to the particular examples given nor to the specific conditions mentioned. The parts are by weight and all temperatures in Centigrade.

*Example 1.*

1 kilo of bis-2.3-hydroxynaphthoyl-dianisidin is mixed with 1 liter of Turkey red oil and 3 liters of caustic soda solution of 30° Bé. in the usual manner, then the mixture is dissolved in about 30 liters of boiling water and made up to 1000 liters of liquor. Simultaneously 2 kilos of sulphur black T extra (Color Index No. 978) and 6 kilos of crystallized sodium sulfide are dissolved in 30 liters of boiling water and the solution is added to the impregnating liquor. Then the material is impregnated with this solution at about 35° C., allowed to drain and rinsed with cold water. It is developed with 1, 2 kilo of diazotised 2.5-dichloroaniline in 1000 liters of liquor. After an usual aftertreatment a dark reddish brown is obtained.

*Example 2.*

3 kilos of the anilide of 2.3-hydroxynaphthoic acid are dissolved in the usual manner after adding 4 liters of Turkey red oil and 9 liters of caustic soda solution of 30° Bé. in about 60 liters of boiling water and the solution is added to a dyeing liquor (1000 liters), containing further 3 liters of a formaldehyde solution of 30%. Simultaneously 2 kilos of blue sulfur dyestuff made from para-para'-dioxy-diphenylamine by the process described in U. S. Patent No. 736,380 and 10 kilos of crystallized sodium sulfide are dissolved in boiling water and this solution is also added to the dye-bath. 50 kilos of cotton yarn are impregnated at about 50° C. for about ½-¾ hour, squeezed, exposed to the air for sometime and developed with 1 kg of diazotised m-nitro-para-toluidin in 1,000 liters of liquor. After an usual aftertreatment a bluish garnet is obtained.

*Example 3.*

3 kilos of diacetoacetyl-ortho-tolidin, 4 liters of Turkey red oil and 9 liters of caustic soda solution of 30° Bé. are dissolved in boiling water, and this solution is added to a dye bath of 1000 liters. 3 kilos of Immedial Brilliant Green GG extra Color Index No. 1006 are dissolved by means of 15 kilos of sodium sulfide (crystallized) in boiling water and this solution is also added to the dye bath. Then the material is dyed and impregnated at about 50° C. for ½-¾ hour, squeezed and developed with 1, 6 kilos of diazotised 2, 5-dichloraniline with 2 liters of glacial acetic acid in 1000 liters of liquor. After an usual aftertreatment a yellowish brilliant green is obtained.

*Example 4.*

400 grs. of the anilide of 2.3-hydroxynaphthoic acid, 100 grs. of sulphur black T extra, 300 grs. of powdered caustic soda, 300 grs. of Turkey red oil and 200 grs. of anhydrous sodium sulfide are intimately mixed to an uniform powder. Then the mixture is dissolved in boiling water, the solution is made up to 50 liters and 400 ccm. of a formaldehyde solution of 30% are added, the material is dyed herewith at about 25° for ½ hour, squeezed and developed with 350 grs. of diazotised meta-chloraniline in 50 liters of liquor. After an usual aftertreatment a yellowish brown is obtained.

I claim:

1. A process of dyeing vegetable fiber which comprises producing mixtures of sulfur dyes with ice colors on the fiber.

2. A process of dyeing vegetable fiber, which comprises combining the fixation of a sulfur dye on the fiber with the production of an insoluble azodyestuff on the fiber according to the ice colors method.

3. A process of dyeing vegetable fiber, which comprises impregnating the material with a solution, containing besides an azo-component a dissolved sulfur dye and developing the ice color by means of a diazosolution and simultaneously converting the leucocompound into the sulfur dyes.

4. A process of dyeing vegetable fiber, which comprises impregnating the material with a solution, containing besides an acyl-acetic acid arylid a dissolved sulfur dye and developing the ice color by means of a diazosolution and simultaneously converting the leucocompound into the sulfur dye.

5. A process of dyeing vegetable fiber, which comprises impregnating the material with a solution, containing besides diacetoacetyl-ortho-tolidin a dissolved sulfur dye and developing the ice color by means of a diazosolution and simultaneously converting the leucocompound into the sulfur dye.

6. A process of dyeing vegetable fiber, which comprises impregnating the material with a solution, containing besides an arylide of 2.3-hydroxynaphthoic acid a dissolved sulfur dye and developing the ice color by means of a diazosolution and simultaneously converting the leucocompound into the sulfur dye.

In testimony whereof, I affix my signature.

Dr. JULIUS RATH.